United States Patent Office 3,334,109
Patented Aug. 1, 1967

3,334,109
CHARGE TRANSFER COMPLEXES
John E. Harris, Hyde Park, Mass., assignor to Monsanto Research Corporation, St. Louis, Mo., a corporation of Delaware
No Drawing. Filed Aug. 7, 1964, Ser. No. 388,308
10 Claims. (Cl. 260—294.9)

This invention relates to new compounds and methods of making the same. More particularly, this invention provides novel charge transfer complex compounds of tetracyanoethylene with heterocyclic aromatic amine hydrohalides, and methods of making the stated compounds.

With certain amines, the reactions of tetracyanoethylene are metathetical, proceeding by elimination of HCN, as illustrated for example by the following equations

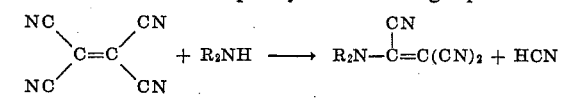

(where R is an organic radical)

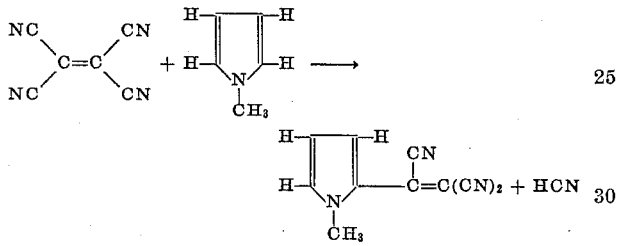

(J. Am. Chem. Soc., 80, 2774, 2818).

When tetracyanoethylene is reacted with a heterocyclic quaternary ammonium halide such as quinoline methiodide, halogen is eliminated from the ammonium halide. The product formed is a charge transfer compound which is an ion radical salt, as illustrated by the equation

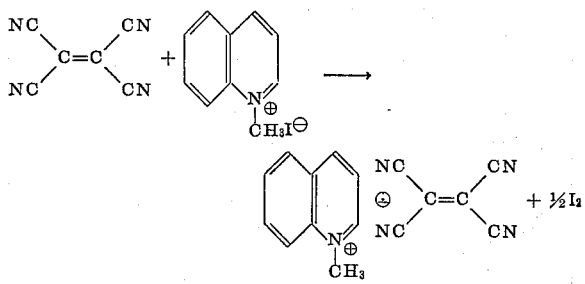

The resulting salts are similar in structure to the charge transfer salts formed when tetracyanoethylene reacts with aliphatic tertiary amines, in a reaction in which the amine picks up a proton (from the solvent) and forms an ion radical salt:

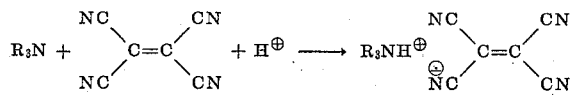

(see J. Am. Chem. Soc. 80, 2774 ff.; 84, 3680 ff.).

Very such the same kind of ion radical salt formation has been reported to occur in reactions of tetracyanoquinodimethane ("TCNQ") with amines and ammonium halides. Thus, reaction with triethylamine ($Et_3N$) in the presence of a proton donor forms a 2:1 charge transfer compound which may be formulated as $$Et_3NH^+(TCNQ)_2^{\doteq}$$

This same charge transfer complex is formed by reaction of one mole of triethylamine hydroiodide with two moles of TCNQ, by elimination of the halogen from the nitrogen compound, as illustrated by the equation

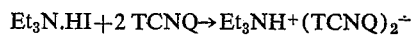

(J. Am. Chem. Soc. 82, 6408–9; 84, 3370 ff.).

It will be noted that these reactions in which charge transfer compounds are formed are not metathetical, and that the tetracyano compound loses none of its substituents, but remains intact.

There is still a third possibility for the course of reactions of pi acids such as tetracyanoethylene and tetracyanoquinodimethane with nitrogenous pi bases such as amines, amine hydrohalides and quaternary ammonium halides. This is the production of a charge transfer compound by adduct formation, without elimination or addition of a substituent from or to either compound. These charge transfer compounds having the formulas of adducts are generally designated pi complexes.

Illustrative of the pi complex charge transfer compounds of tetracyanoethylene, for example, are the compounds formed with pyridine (J. Am. Chem. Soc., 80, 2779) and with tetramethylphenylenediamine (Z. Elektrochem., 66, 331). They are 1:1 molar adducts, which may be formulated as

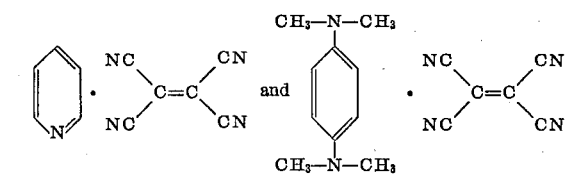

These pi complex charge transfer compounds are understood to have a bond formed by an electron transfer between the pi acid (tetracyanoethylene) and the pi base (pyridine, tetramethylphenylenediamine). The pi acid is an electron acceptor, and the pi base is an electron donor. As will be appreciated from a consideration of the above formulas, while the stated two kinds of nonmetathetical reaction products of pi acids like tetracyanoethylene with nitrogenous pi bases are both charge transfer compounds, the pi complex compounds are different from the ion radical salts. The pi complex compounds have the formula of adducts, coresponding to the additive formulas of the neutral molecules of the reactants from which they are derived. These pi complex compounds may be pictured as consisting of charged species, as a result of electron transfer

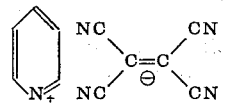

However, except for such bond formation by electron transfer and combination as an adduct, the formulas of the reactants are unchanged in the pi complex. By contrast, the formation of the ion radical salts involves a change in composition, in which the nitrogenous pi base either loses or adds a substituent, such as a halogen or hydrogen atom. The resulting salts containing a quaternary ammonium cation, such as

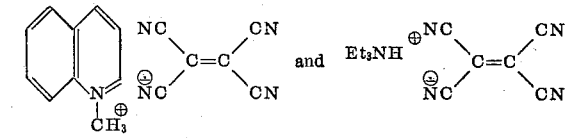

have a composition which differs from the sum of the formulas of the neutral pi acid and base reactants from which they are derived. Thus these ion radical salt charge transfer compounds are different from adducts.

It is an object of this invention to provide a novel charge transfer compound of tetracyanoethylene.

A particular object of this invention is to provide a novel charge transfer adduct of tetracyanoethylene with a nitrogen compound.

These and other objects will become evident upon consideration of the following specification and claims.

It has now been found that reaction of tetracyanoethylene with a hydrohalide of a tertiary heterocyclic amine of aromatic character produces a novel charge transfer compound.

The stated reaction is illustrated by the equation

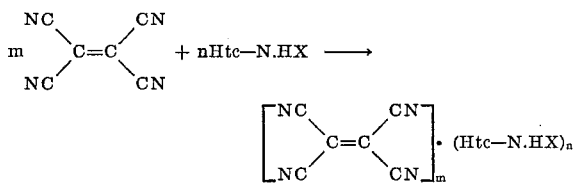

where Htc-N represents a tertiary heterocyclic amine of aromatic character (such as pyridine, for example), X is a halogen atom (such as Cl or Br, for example), and $m$ and $n$ are small digits (not including zero), such as 1 or 2.

As may be seen from a consideration of this equation, the halogen in the amine hydrohalide reactant is retained in the product of the reaction, and the product is a charge transfer compound which is an adduct of the pi acid and pi base reactants.

From the discussion hereinabove of previously reported reactions of cyano-substituted pi acids with tertiary amine compounds, it will be evident that the course of the stated reaction is surprising. Analogy to the reaction of tetracyanoethylene with a quaternary ammonium halide, for example, would have suggested that elimination of halogen would occur.

Also, reactions of tetracyanoethylene as a pi acid have frequently been observed to parallel those of tetracyanoquinodimethane (TCNQ), as discussed above. It is known that a pi complex is formed by reaction of tetracyanoquinodimethane with diaminodurene, as illustrated by the equation:

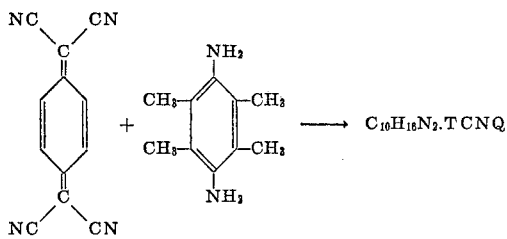

Further, the reaction of tetracyanoquinodimethane with diaminodurene dihydroiodide has been investigated, and it is reported (J. Am. Chem. Soc., 82, 6408–9) that the result is elimination of halogen and formation of an ion radical salt, as illustrated by the equation $$2\,TCNQ + C_{10}H_{16}N_2 \cdot (HI)_2 \rightarrow C_{10}H_{16}N_2H^+ (TCNQ)_2^-$$

(or, regarding one of the pi acid molecules as formally neutral, $C_{10}H_{16}N_2H^+TCNQ^- \cdot TCNQ$). Thus this pi acid forms an adduct with the free pi base, while it forms an ion radical salt with the hydrohalide of the same base, by elimination of halogen.

Now, in the presently provided novel method of producing a charge transfer compound of tetracyanoethylene, the tertiary amine reactant employed may be a pyridine hydrohalide. As noted above, it is known that pyridine and tetracyanoethylene form a pi complex charge transfer compound which is a 1:1 molar adduct of the pi base and pi acid, which is like the formation of an adduct by tetracyanoquinodimethane and diaminodurene. In contrast to the above-stated reaction of tetracyanoquinodimethane with an amine hydrohalide, however, the reaction of tetracyanoethylene with a pyridine hydrohalide does not follow an analogous course. The result is not elimination of halogen, but rather the halogen is retained and the product is an adduct.

The presently-provided products of the above-described novel reaction and method are a novel kind of charge transfer complex of a cyano-substituted pi acid, inasmuch as they contain halogen in the molecule.

Interestingly, the colors of the presently provided pyridine hydrohalide charge transfer complexes parallel the colors of the respective halogens: greenish for the chlorine-containing complex, red-brown for the bromine, and purple for the iodine one.

The formula given for the present novel compounds

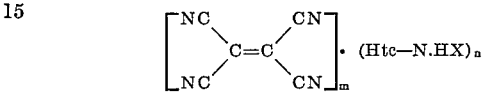

(where Htc-N, X, $m$ and $n$ are as above defined) is not intended to be limiting as to the structure of the stated compounds. They are adducts which are charge transfer compounds. As contrasted to ion radical charge transfer compounds, the adduct molecule has the same composition as the neutral molecules of pi acid and pi base from which it is formed. The adducts may thus be designated pi complex charge transfer compounds, using the term, "pi complex," to designate compounds which consist of an adduct that can be formally dissociated to neutral molecules without addition or elimination of a radical species. Whether in fact an electron transfer provides the only bond between the components of the adduct or whether there is any further ionization is undetermined. It is conceivable that these complexes include ion radicals: at least, the compounds appear to contain ammonium species in the state $Htc-NH^+$. In any case, however, the present compounds have the empirical formula of adducts of heterocyclic aromatic tertiary amine hydrohalides with tetracyanoethylene.

The compounds of this invention may be used for a variety of industrial and agricultural purposes. For example, they may be used as semiconductors of electricity, as photoconductors, as thermal conductors or the like. They may be used as agricultural toxicants, for example, as insecticides, and particularly, as agricultural insecticides, since these compounds are generally nontoxic to plant life. They may also be employed as halogenating agents, for purposes of chemical synthesis, and so forth.

Referring now in more detail to the practice of the present invention, amine hydrohalides which may be employed to prepare the present novel charge transfer complex compounds are the hydrohalides of tertiary heterocyclic amines of an aromatic character, as stated above.

By the term hydrohalides, it is intended to include hydrofluorides, hydrochlorides, hydrobromides and hydroiodides, and further, hydropolyhalides, that is, compounds in which the portion of the hydrohalide designated in the above formula as X is a polyhalogen ion, such as $I_3^-$, $ICl_2^-$, $IBr_2^-$, $I_5^-$, $BrF_4^-$, $ClF_4^-$, and so forth.

By a tertiary heterocyclic amine of aromatic character, or in other words, a tertiary aromatic heterocyclic amine, is meant a heterocyclic compound in which nitrogen is a ring member in a six-membered ring having resonating, conjugated unsaturation like that of aromatic rings such as benzene. The heterocyclic compound may be monocyclic or polycyclic, containing up to 3 rings. The presently provided compounds may contain from 1 to 4 heterocyclic ring tertiary nitrogen atoms. The remainder of the ring compounds, apart from the stated nitrogen atoms, are hydrocarbon, that is, carbon and hydrogen. The ring carbon atom substituents may be hydrogen or alkyl hydrocarbon groups, particularly lower alkyl, of from 1 to 6 carbon atoms.

Thus, illustrative of amine hydrohalides useful for the practice of the present invention are, for example, pyridine hydrobromide, pyridine hydrochloride, pyridine hydroiodide, pyridine hydrofluoride, pyridine hydrotriiodide (pyridinium triiodide), pyridine hydrodichloroiodide, pyridine hydrotetrafluorobromide, quinoline hydrobromide, quinoline hydrochloride, isoquinoline hydrobromide, isoquinoline hydrochloride, acridine hydrobromide, acridine hydroiodide, phenanthridine hydrobromide, pyrazine dihydrobromide, pyrazine dihydrochloride, pyridazine dihydrochloride, pyrimidine dihydromide, pyrimidine dihydrochloride, pyrimidine dihydrofluoride, pyrimidine dihydroiodide, phthalazine dihydrobromide, cinnoline dihydrobromide, quinazoline dihydrobromide, quinazoline dihydrochloride, quinoxaline dihydrobromide, quinoxaline dihydrochloride, 2,2'-bipyridyl dihydrobromide, o-phenanthroline dihydrobromide, 1-(4-pyridyl)pyridinum chloride hydrochloride,

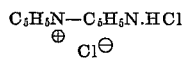

2,2',2'''-tripyridyl trihydrochloride, phenazine dihydrochloride, 4,4'-bipyridyl dihydrochloride, 4,4'-bipyridyl monohydrochloride, naphthyridine dihydrobromide, 1,3,5-triazine trihydrobromide, 1,3,5-triazine trihydrochloride, 1,2,4-triazine trihydrobromide, 1,3,5-triazine trihydroiodide, 2-picoline hydrobromide, 3-picoline hydrochloride, 4-picoline hydroiodide, 2,6-lutidine hydrobromide, 2,4-lutidine hydrochloride, 2,5-lutidine hydrofluoride, 3,4-lutidine hydroiodide, 2,4,6-collidine hydrobromide, quinaldine hydrobromide, lepidine hydrobromide, 2-ethylpyridine hydrochloride, 4-ethylpyridine hydrobromide, 4-ethylpyridine hydroiodide, 2,6-diethylpyridine hydroiodide, 2,4-dipropylpyridine hydrobromide, 4-cyclohexylpyridine hydrobromide, 4-isopropylquinoline hydrochloride, 6,6'-dimethyl-2,2'-bipyridyl dihydrobromide, 3,6-dibutylquinoline hydrobromide, 3,6-dimethylacridine hydrobromide, 6-hexylisoquinoline hydrobromide, and the like.

The presently provided products of addition of amine hydrohalides to tetracyanoethylene are designated charge transfer adducts of the amine hydrohalide with tetracyanoethylene, and include the charge transfer adducts of tertiary aromatic amine hydrohalides, as exemplified above, with tetracyanoethylene. In the presently provided compounds, the molar ratio of amine hydrohalide to tetracyanoethylene observed in the adducts of a heterocyclic amine hydrohalide containing one nitrogen atom is 2:1; the ratio may vary, over the range of 2:1 to 1:2, depending particularly on the number of N atoms in the amine.

For preparation of the compounds of the invention, a tertiary amine hydrohalide as described above will be contacted with tetracyanoethylene. Formation of the adduct can be effected either in the presence or the absence of an inert solvent or diluent. When such a liquid reaction medium is employed, it is conveniently a liquid in which the reactants are at least partially soluble. It has been found that the present reaction can be conducted successfully in organic solvents which are proton donors and which have a high dielectric constant, such as acetonitrile; this is particularly interesting since such solvents are employed for preparation of ion radical salts of tetracyanoethylene, and might be expected to interfere with adduct formation. Solvents of lower dielectric constant, such as methylene dichloride, are also useful. Illustrative of convenient solvents are inert organic liquids such as nitriles such as acetonitrile; halogenated hydrocarbons such as methylene dichloride, chlorobenzene, benzotrifluoride, chloroform and bromoform; ethers such as tetrahydrofuran and diethyl ether; hydrocarbons such as benzene, hexane, cyclohexane, toluene and the xylenes; ketones such as acetone and methyl ethyl ketone; dimethyl sulfoxide, dimethyl formamide, and so forth. It is desirable to use anhydrous solvents (and generally to conduct the reaction under anhydrous conditions), and to employ a pH which is close to neutral.

As indicated above, the molecular proportions of the tertiary amine hydrohalide required for each molecular proportion of tetracyanoethylene by the stoichimetry of the reaction may vary. However, even in the absence of a liquid reaction medium, it is found that the 2:1 molar ratio charge transfer adduct of a mono-amine hydrohalide with tetracyanoethylene is formed employing a molar ratio of tetracyanoethylene to the amine hydrohalide of 1:1, and an excess of either of the reactants, ranging up to, say, a molar ratio of 10:1, may be used if desired. Generally, a convenient procedure may be to add one reactant slowly to an excess of the other.

The temperature and pressure conditions under which this invention takes place can be varied widely. Satisfactory yields are usually obtained at atmospheric pressure. Temperatures from as low as −50° or below up to as high at 150° C. and above are operative, depending on the reactants; however, since the tetracyanoethylene can polymerize or otherwise undergo side reactions at high temperatures, it is convenient to carry out the reactions at room temperature (about 70° F.) or below. In general, the reaction proceeds with rapidity, and catalysts are unnecessary. On completion of the reaction, the charge transfer complex product may be isolated by any suitable method such as distillation, extraction, precipitation or the like.

The invention is illustrated but not limited by the following examples, in which all temperatures are degrees centigrade, unless stated otherwise.

*Example 1*

This example illustrates the preparation of a charge transfer adduct of pyridine hydrochloride with tetracyanoethylene.

A mixture of 25.6 grams (g.) (0.2 mole) of tetracyanoethylene with 110 milliliters (ml.) of acetonitrile is added rapidly to 21.1 g. (0.2 mole) of pyridine hydrochloride in 50 ml. of acetonitrile. The reaction mixture is stirred for an hour under nitrogen, filtered, and cooled in an ice bath. The yellow crystalline precipitate which forms is separated by filtration and dried. A yield of 17 g. of yellow-green crystalline product is obtained. After being dried in a desiccator over phosphorus pentoxide for several days, the melting point is 114–116°.

The stated crystalline product is the 2:1 molar adduct of pyridine hydrochloride with tetracyanoethylene, of the formula

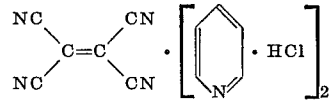

Elemental analysis gives results in conformity with the assigned structure:

Calcd. for $C_{16}H_{12}N_6Cl_2$: C, 53.49; H, 3.36; Cl, 19.74; N, 23.39. Found: C, 53.17; H, 3.70; Cl, 19.24; N, 23.39 (by difference).

*Example 2*

This example illustrates another preparation of the charge transfer adduct of pyridine hydrochloride with tetracyanoethylene.

A mixture of 1.3 g. (0.01 mole) of tetracyanoethylene with 25 ml. of acetonitrile is added to 1.05 g. (0.01 mole) of pyridine hydrochloride in 25 ml. of acetonitrile, cooled to −22° under nitrogen. The resulting mixture is stirred for several hours and then concentrated on a flash evaporator. Green-brown crystals are produced which melt at 101–105° C.

Separately, a mixture of 0.01 mole each of pyridine hydrochloride and tetracyanoethylene is ground in a mortar. The mixture turns yellow-green and has a melting point of 94–96.5°.

Infrared analyses of the two reaction products, prepared in solution, and prepared without solvent, give nearly identical spectra, with a weak CN doublet and a broad pyridinium band. The ultraviolet spectrum of the solvent reaction product shows absorption at 400 mμ, ξ=7.4×10², and 420 mμ, ξ=7.3×10².

The pyridine hydrochloride tetracyanoethylene adduct changes from yellow-green to black on exposure to light. The blackening appears within a few minutes when the compound is exposed to ultraviolet light, and evolution of gaseous decomposition products is observed.

*Example 3*

This example illustrates preparation of the charge transfer adduct of pyridine hydrobromide with tetracyanoethylene.

Addition of 12.8 g. (0.1 mole) of tetracyanoethylene to 16.0 g. of pyridine hydrobromide (0.1 mole) in 40 ml. of acetonitrile, under nitrogen, is followed by stirring the mixture for 2 hours at ambient temperature (about 70° F.). The mixture is then cooled, producing separation of red crystals which are recovered by filtration. The mother liquid is concentrated, by evaporating off the acetonitrile, to produce a further crop of red-brown needles. The crystalline product, after drying under vacuum and then in a desiccator over phosphorus pentoxide, melts at 112–113° C.

The stated crystalline product is the 2:1 molar adduct of pyridine hydrobromide with tetracyanoethylene, of the formula

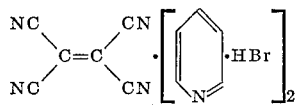

Elemental analysis gives results in conformity with the assigned structure:

Calcd. for $C_{16}H_{12}N_6Br_2$: C, 42.88; H, 2.70; Br, 35.66; N, 18.75. Found: C, 42.97; H, 2.13; Br, 35.26; N, 19.04 (by difference).

*Example 4*

This example illustrates another preparation of the charge transfer adduct of pyridine hydrobromide with tetracyanoethylene.

A mixture of 1.3 g. (0.01 mole) of tetracyanoethylene with 25 ml. of acetonitrile is added slowly to 1.6 g. (0.01 mole) of pyridine hydrobromide in 25 ml. of acetonitrile, cooled to −22° C., under nitrogen. The addition takes about a half hour. The brown reaction mixture is then stirred at −27° for 2 hours. Concentration of the reaction mixture by evaporation of the acetonitrile produces a red-brown crystalline precipitate which is separated by filtration and dried. The product melts at 109–112° C.

In a second preparation, a 1:1 molar ratio mixture of pyridine hydrobromide and tetracyanoethylene is ground together in a mortar, with a pestle. The red-brown mixture melts at 110–112° C.

The infrared spectrum of the red-brown crystals isolated from the combination of the reactants in solution and that of the product of mixing, without solvents, are almost identical. They show a weak CN doublet and have a broad band corresponding to the charged pyridinium band.

The ultraviolet spectrum of the solution reaction product in methylene dichloride shows two bands, at 400 mμ, ξ=4.2×10² and at 420 mμ, ξ=4.3×10².

*Example 5*

This example illustrates preparation of a charge transfer adduct of pyridine hydroiodide with tetracyanoethylene.

The thimble of a Soxhlet extraction apparatus is charged with 20.7 g. (0.1 mole) of pyridine hydroiodide, and 12.8 g. of powdered tetracyanoethylene (0.1 mole) in 250 ml. of methylene dichloride is placed in a flask fitted to the apparatus. The flask is heated on a steam bath, producing extraction of the pyridine hydroiodide into the tetracyanoethylene solution. The extraction is continued for 4 days. The cooled reaction mixture contains a black solid below a liquid layer. The liquid is decanted and evaporated down to leave a residue which is a purple solid, m. 130–133° C. The purple solid is the product, the charge transfer complex of pyridine hydroiodide with tetracyanoethylene in a molar ratio of 2:1, of the formula

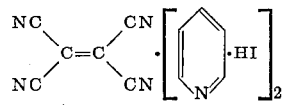

*Example 6*

This example illustrates another preparation of the charge transfer adduct of pyridine hydroiodide and tetracyanoethylene.

A mixture of 2.3 g. (0.01 mole) of pyridine hydroiodide hydrate with 3 g. of magnesium sulfate in 50 ml. of acetonitrile is cooled to −22° C. On slow addition of 1.3 g. of tetracyanoethylene (0.01 mole) in 25 ml. of acetonitrile to the pyridine hydroiodide, appearance of a green color at the point of mixing is observed. The mixture is stirred for several hours and then concentrated at room temperature on a flash evaporator. The purple solid residue melts at 89–99° C.

Separately, a mixture of 0.01 mole each of pyridine hydroiodide hydrate and tetracyanoethylene is ground in a mortar, to produce a purple solid which melts at 84–92° C.

The infrared spectra of the solution reaction product and the dry reaction product each have a strong shifted CN band and very little salt band.

Ultraviolet analysis of the solution reaction product in methylene dichloride shows absorption at 400 mμ, ξ=1.08×10⁴ and at 419 mμ, ξ=1.08×10⁴.

*Example 7*

This example illustrates still another preparation of the charge transfer complex of pyridine hydroiodide and tetracyanoethylene.

A solution of 19.4 g. (0.15 mole) of tetracyanoethylene in 100 ml. of acetonitrile is added slowly to a mixture of 30 g. (0.15 mole) of pyridine hydroiodide and 150 ml. of acetonitrile, cooled to −27° C. A green color appears initially at the point of addition; the reaction mixture changes from yellow to dark brown as the addition progresses. After completion of the addition, which requires about an hour, the reaction mixture is stirred for another hour. It is then filtered to separate a dark brown solid precipitate which, on drying on air, becomes dark purple. The filtrate is flash evaporated to dryness, providing the product as a purple solid.

Tetracyanoethylene can be extracted from this product with chloroform and with chlorobenzene. The purple solid is slightly soluble in methylene dichloride and quite soluble in nitromethane, nitrobenzene and pyridine.

*Example 8*

This example illustrates preparation of a charge transfer adduct from pyridine hydrotriiodide and tetracyanoethylene. Following a procedure as described in Example 5, 11.7 g. of pyridine hydrotriiodide in the thimble of a Soxhlet extraction apparatus is extracted with a solution of 3.25 g. of tetracyanoethylene in 250 ml. of methylene dichloride for 4 days. The flask containing the reaction mixture is cooled and the supernatant liquid is decanted from solids in the reaction mixture, in a dry atmosphere. The residual solids are dark needles. This crystalline material is washed with methylene dichloride and dried. The dry product melts at 79–81° C.

*Example 9*

This example describes utilization of the presently provided charge transfer adducts as insecticides.

Weighed samples of the charge transfer adducts of tetracyanoethylene with pyridine hydrobromide and with pyridine hydrochloride are each separately dissolved in acetone to give a concentration of 20 micrograms per microliter of solution. One-microliter drops of one of these solutions are applied from a topical applicator to the underside of the abdomens of adult plum curculio (anesthetized with carbon dioxide). The treated curculio are held at room temperature in ventilated tubes supplied with food. Each of the charge transfer adducts produces kill of the insects within 48 hours.

When the pyridine hydrobromide adduct is applied topically to 48 hour old female houseflies, *Musca domestica*, the treated flies being held at 68° F. and 50–60% relative humidity, kill is produced within 24 hours.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A charge transfer adduct of tetracyanoethylene with tertiary aromatic heterocyclic amine hydrohalides selected from the group consisting of pyridine hydrohalides and lower alkyl substituted pyridine hydrohalides.
2. The adduct of claim 1 wherein said hydrohalide is pyridine hydrohalide.
3. The compounds of claim 1 in which said amine contains a single nitrogen atom.
4. The compounds of claim 1 in which said amine is pyridine.
5. A charge transfer adduct of a pyridine hydrohalide and tetracyanoethylene in which the ratio of said pyridine hydrohalide to said tetracyanoethylene is 2:1.
6. The compound of claim 5 in which said hydrohalide is hydrochloride.
7. The method of producing a charge transfer adduct of tetracyanoethylene with a heterocyclic aromatic tertiary amine hydrohalide chosen from the group consisting of pyridine hydrohalides and lower alkyl substituted pyridine hydrohalides which comprises contacting tetracyanoethylene with said heterocyclic aromatic tertiary amine hydrohalide in acetonitrile.
8. The method of producing a charge transfer adduct of tetracyanoethylene with a pyridine hydrohalide which comprises contacting tetracyanoethylene with a pyridine hydrohalide in acetonitrile.
9. Charge transfer adducts of tetracyanoethylene with heterocyclic aromatic tertiary amine hydrohalides, and the molar ratio of said amine hydrohalide to said tetracyanoethylene is 2:1.
10. A charge transfer adduct of a pyridine hydrobromide and tetracyanoethylene in which the ratio of said pyridine hydrobromide to said tetracyanoethylene is 2:1.

References Cited

UNITED STATES PATENTS

| 3,122,571 | 2/1964 | Acker et al. | 260—396 |
| 3,162,641 | 12/1964 | Acker et al. | 260—396 |

OTHER REFERENCES

Merrifield et al.: J. Am. Chem. Soc., vol. 80, 1958, pp. 2778–82.

WALTER A. MODANCE, *Primary Examiner.*

JOHN D. RANDOLPH, *Examiner.*

ALAN L. ROTMAN, *Assistant Examiner.*